(12) United States Patent
Baranger

(10) Patent No.: US 11,548,322 B2
(45) Date of Patent: Jan. 10, 2023

(54) HEAVY GOODS VEHICLE TIRE WITH IMPROVED ENDURANCE

(71) Applicant: COMPAGNIE GENERALE DES ETABLISSEMENTS MICHELIN, Clermont-Ferrand (FR)

(72) Inventor: Eddy Baranger, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 42 days.

(21) Appl. No.: 16/956,555

(22) PCT Filed: Dec. 21, 2018

(86) PCT No.: PCT/FR2018/053529
§ 371 (c)(1),
(2) Date: Jun. 19, 2020

(87) PCT Pub. No.: WO2019/122791
PCT Pub. Date: Jun. 27, 2019

(65) Prior Publication Data
US 2021/0146728 A1    May 20, 2021

(30) Foreign Application Priority Data
Dec. 22, 2017   (FR) ..................... 17/63005

(51) Int. Cl.
*B60C 11/03* (2006.01)
*B60C 9/18* (2006.01)
(Continued)

(52) U.S. Cl.
CPC ........ *B60C 11/0323* (2013.01); *B60C 9/2006* (2013.01); *B60C 11/005* (2013.01);
(Continued)

(58) Field of Classification Search
CPC .......... B60C 2200/06; B60C 2200/065; B60C 11/02; B60C 11/03
See application file for complete search history.

(56) References Cited

U.S. PATENT DOCUMENTS

| 3,240,249 A | 3/1966 | Pirelli |
| 2010/0186860 A1 | 7/2010 | Georges et al. |

(Continued)

FOREIGN PATENT DOCUMENTS

| EP | 0987128 A2 * | 3/2000 | ............... B60C 9/02 |
| EP | 2 292 448 | 3/2011 | |

(Continued)

OTHER PUBLICATIONS

Office Action dated Feb. 16, 2022 issued in Chinese Patent Application No. 201880080964.8.

*Primary Examiner* — Cedrick S Williams
(74) *Attorney, Agent, or Firm* — Cozen O'Connor

(57) ABSTRACT

Heavy goods vehicle tire, having a crown portion covered radially on the outside by a tread, this tread having at least two cut-outs, the central portion of the tread having a width Lc of between 35% and 70%, the crown portion comprising a reinforcement having at least two working layers having reinforcing elements, these reinforcing elements consisting of UHT-grade threads, having a mechanical breaking strength R satisfying the following relation: R≥(4180−2130×D), where D is the diameter of the thread expressed in millimetres, this tread being formed of at least two layers of superimposed material, the material forming the first layer with a breaking elongation of more than 600% at a temperature of 60° C., this tread being such that, in the central portion, the cavity ratio per unit volume is not more than 10% and the surface cavity ratio as new is not more than 10%.

11 Claims, 2 Drawing Sheets

(51) Int. Cl.
*B60C 9/20* (2006.01)
*B60C 11/00* (2006.01)
*B60C 11/02* (2006.01)

(52) U.S. Cl.
CPC ............ *B60C 11/02* (2013.01); *B60C 11/033* (2013.01); *B60C 2009/208* (2013.01); *B60C 2009/209* (2013.01); *B60C 2009/2077* (2013.01); *B60C 2009/2093* (2013.01); *B60C 2011/0025* (2013.01); *B60C 2011/0033* (2013.01); *B60C 2011/0341* (2013.01); *B60C 2200/06* (2013.01)

(56) References Cited

U.S. PATENT DOCUMENTS

| | | | |
|---|---|---|---|
| 2013/0146191 A1* | 6/2013 | Audigier | B60C 11/0323 152/209.21 |
| 2013/0276945 A1* | 10/2013 | Colby | B60C 11/02 152/209.1 |
| 2016/0207269 A1* | 7/2016 | Colby | B60C 11/02 |
| 2017/0157989 A1* | 6/2017 | Barbarin | B60C 11/1218 |
| 2017/0174008 A1* | 6/2017 | Marlier | B60C 11/042 |
| 2018/0178587 A1* | 6/2018 | Gayton | B60C 11/0323 |

FOREIGN PATENT DOCUMENTS

| | | | |
|---|---|---|---|
| EP | 2 694 301 | 3/2015 | |
| FR | 2 950 565 | 4/2011 | |
| WO | WO 2012/131081 | 10/2012 | |
| WO | WO 2013/079336 | 6/2013 | |
| WO | WO-2016188956 A1 * | 12/2016 | ......... B60C 11/0323 |
| WO | WO 2017/103434 | 6/2017 | |
| WO | WO 2017/103460 | 6/2017 | |
| WO | WO 2017/194874 | 11/2017 | |

* cited by examiner

HEAVY GOODS VEHICLE TIRE WITH IMPROVED ENDURANCE

RELATED APPLICATIONS

This is a U.S. National Phase Application under 35 USC 371 of International Application PCT/FR2018/053529 filed on Dec. 21, 2018.

This application claims the priority of French application no. 17/63005 filed Dec. 22, 2017, the entire content of which is hereby incorporated by reference.

FIELD OF THE INVENTION

The present invention relates to a tire, with a radial carcass reinforcement, and more particularly a tire intended for fitting to vehicles carrying heavy loads and travelling at a sustained speed, such as lorries, tractors, trailers or buses.

BACKGROUND OF THE INVENTION

A heavy goods vehicle tire usually comprises beads designed to make contact with a mounting rim, these beads being prolonged radially outwards by sidewalls which are themselves joined to either side of a crown portion, this crown portion being covered by a tread having the function of providing contact with the road during running.

A tire also comprises a carcass reinforcement anchored in the beads, this carcass reinforcement extending in the sidewalls to the crown of the tire. This carcass reinforcement, formed of one or more reinforced layers, is surmounted radially towards the outside in the crown portion of the tire by a crown reinforcement which is itself formed of a plurality of reinforced layers.

Among the reinforced layers of the crown reinforcement there are at least two layers known as working layers, each of these working layers comprising a plurality of reinforcing elements such as low-extensibility metal threads or cords, these reinforcing elements being arranged parallel to one another in each working layer and crossed over from one working layer to the next, lying at an angle chosen to be between 10° and 45° to the circumferential direction of the tire.

Cords or reinforcing elements are described as low-extensibility or even inextensible in the present description where said cords have a relative elongation of not more than 0.2% when subjected to a tensile force of 10% of their breaking strength.

Forming part of the crown reinforcement, at least one additional layer, called the protective layer, is provided and is positioned radially outside the working layers, this protective layer being formed of reinforcing elements which are advantageously "elastic", that is to say reinforcing elements having a much greater extensibility than that of the reinforcing elements of the working layers.

Cords or reinforcing elements are called elastic or are said to have high extensibility in the present description where said cords have a relative elongation of at least 3% when subjected to a tensile force equal to the breaking load, and have a maximum tangent modulus of less than 150 GPa.

The production of a cord consisting of a plurality of elementary metal threads so as to be elastic or low-elastic depends on the way in which the threads are assembled together to form said cord (this is what is known as the cord structure).

The crown reinforcement may also comprise a triangulation layer comprising a plurality of low-extensibility metal threads or cords lying at an angle chosen to be between 45° and 90° to the circumferential direction of the tire, this triangulation layer most commonly being located radially between the carcass reinforcement and the first working layer. Other layers may also be integrated with the crown reinforcement, for example hooping layers comprising reinforcements which may or may not be inextensible and which are orientated at a zero angle or a very small angle (that is to say, less than 10 degrees) to the circumferential direction of the tire.

A tread is placed radially on the outside of the crown reinforcement, the tread usually consisting of polymer materials (or rubber materials), this tread being designed to provide contact with a roadway in a contact area between said roadway and the tire.

To meet the requirements of the heavy goods vehicle tire market, one of the aims of those skilled in the art is to reduce the total weight of the tire. One feasible method is that of reducing the weight of the reinforcing elements and notably those of the crown reinforcement.

The reinforcing elements of the working layers may be lightened, for example, by using smaller-diameter reinforcing elements, as described for example in the document U.S. Pat. No. 3,240,249. It should be noted that this reduction in the diameter of the reinforcing elements is very commonly accompanied by an increase in the tenacity of the steel. Thus it is known to use smaller reinforcing elements to lighten tires, the weight being reduced, on the one hand, by a smaller amount of metal, and on the other hand by a decrease in the volume of elastomer mixtures forming the liners of the working layers.

For the purposes of the present invention, a "thread of at least UHT grade", where the abbreviation UHT signifies "Ultra High Tenacity" in English, is a metal thread having a mechanical breaking strength denoted R and expressed in MPa, such that $R \geq 4180 - 2130 \times D$, where D is the diameter of the thread expressed in millimetres, and x indicates the operation of multiplication.

However, a reduction of the amount of metal in the working layers of the crown reinforcement may lead to a reduction in the endurance of the crown reinforcement of the tire that may affect the possibility of renewing its tread by retreading.

Notably, if the tire accidentally runs over a point obstacle of relatively large size with respect to the tire and its tread, the crown reinforcement is abruptly subjected to an impact generating a very high degree of deformation that may cause partial or even total breakage of reinforcing elements. This type of accidental damage is conventionally described as a "road hazard" (as it is known in English).

It has been observed that the resistance to these high-energy running stresses of a tire whose working layers have been lightened may prove to be very significantly affected. This reduction in performance may modify the capacity of the tire to be retreaded when this is required.

SUMMARY OF THE INVENTION

Thus, one object of the invention is to provide tires for heavy goods vehicles having a reduced weight but retaining satisfactory performance in terms of endurance and resistance to road hazards. Furthermore, in order to allow for the renewal of a tire tread after wear, it is important that the crown reinforcement should remain undamaged in terms of its characteristics, without any loss of strength due to the running conditions.

With the aim of increasing the lifetime of tires subject to wear, it is also known to choose materials for the tire tread that have improved properties of wear resistance. Such materials most commonly lead to a deterioration of the properties of hysteresis, that is to say to an increase of energy losses during running, and consequently to an increase in the fuel consumption of the vehicle.

It is also known to form the tread of a tire by superimposing at least two different materials, in order to obtain, for the intended applications, a better compromise between the wear properties and the energy losses related to the hysteresis of the materials.

This is the case, for example, with the document WO 2013/079336, which describes the superimposition of two layers of different materials for forming the tread of a heavy goods vehicle tire, the material of the outermost layer being chosen to have better performance in terms of wear than the material of the innermost layer, the material of the latter layer having appropriate hysteresis properties for limiting the temperature of the tread in the vicinity of the crown reinforcement and thus limiting the hysteresis losses in the tread during running.

The layer of filled elastomer mixture forming the radially outer portion of the tread and designed to be worn during running has a macro-dispersion rating Z of more than 80 and a maximum value of $\tan(\delta)$, denoted $\tan(\delta)max$, of less than 0.130.

The loss factor $\tan(\delta)$ is a dynamic property of the layer of rubber mixture. It is measured with a viscosity analyser (Metravib VA4000), according to the ASTM D5992-96 standard. The response of a sample of vulcanized composition (cylindrical test specimen with a thickness of 4 mm and a cross section of 400 $mm^2$), subjected to alternating simple sinusoidal shear stress at a frequency of 10 Hz and a temperature of 60° C., is recorded. A peak-to-peak deformation amplitude scan is performed from 0.1% to 50% (outward cycle) and then from 50% to 1% (return cycle). For the return cycle, the maximum observed value of $\tan(\delta)$, denoted $\tan(\delta)max$, is indicated.

The rolling resistance of a tire corresponds to the ratio of energy loss to the energy supplied to make the tire roll. This energy loss is manifested in a rise in temperature of the tire. This energy loss is thus associated with the hysteresis losses due to the deformation of the tire during a wheel revolution. The values of $\tan(\delta)max$ of the materials used are measured at 10 Hz between 30° C. and 100° C., in order to incorporate the effect of the different deformation frequencies caused by the rotation of the tire. The value of $\tan(\delta)max$ at 60° C. is thus an indicator of the rolling resistance of the tire during running.

The hysteresis characteristic of the materials may also be estimated by making a measurement, notably on test specimens of material taken from a tire, of the energy losses by rebound at a set energy and for a temperature of 60° C.

A macro-dispersion rating Z of more than 80 of a filled elastomer mixture signifies that the filler is dispersed in the elastomer matrix of the composition with a dispersion rating Z greater than or equal to 80.

In the present description, the dispersion of filler in an elastomer matrix is characterized by the rating Z, which is measured, after cross-linking, by the method described by S. Otto and others, in Kautschuk Gummi Kunststoffe, 58 Jahrgang, NR 7-8/2005, in accordance with the ISO 11345 standard.

The calculation of the rating Z is based on the percentage of the surface in which the filler is not dispersed ("% non-dispersed surface"), as measured by the disperGRADER+ apparatus, with its operating instructions and disperDATA operating software, supplied by the Dynisco company, using the following formula: Z=100−(% non-dispersed surface)/0.35.

The percentage of non-dispersed surface, for its part, is measured using a camera that observed the surface of the test specimen under incident light at 30 degrees. The light points are associated with filler and agglomerations, while the dark points are associated with the rubber matrix; digital processing converts the image to a black and white image, and enables the percentage of non-dispersed surface to be determined, as described by S. Otto in the document cited above.

The higher the Z rating, the better is the dispersion of the filler in the rubber matrix (a Z rating of 100 corresponds to a perfect dispersion and a Z rating of 0 corresponds to a poor dispersion). A Z rating greater than or equal to 80 is considered to correspond to a very good dispersion of the filler in the elastomer matrix.

The layer of elastomer mixture placed most closely to the crown reinforcement and forming the other layer has a breaking elongation of more than 600% at 60° C.

The same document WO 2013/079336 indicates that it is advantageous to choose the material of the tread located most closely to the crown reinforcement from among materials having a breaking energy of more than 165 MJ.

Tensile tests enable the elasticity characteristics and the breaking properties of the tread material to be determined. They are conducted according to the AFNOR-NF-T-46-002 standard of September 1988. In second elongation (that is to say, after a cycle of accommodation to the extension rate specified for the measurement itself), the nominal secant modulus (or apparent strain) is measured in MPa at 100% elongation or at 10% elongation. The tensile measurements for determining the secant accommodated moduli are made at the temperature of 23° C.+/−2° C., and in the normal humidity conditions (50+/−5% relative humidity) according to French standard NF T 40-101 (December 1979).

The breaking stresses (in MPa) and the breaking elongations (in %) of the tread material are also measured. The tensile measurements for determining the breaking properties are made at the temperature of 60° C.±2° C., and in the normal humidity conditions (50±5% relative humidity) according to French standard NF T 40-101 (December 1979), on test specimens taken from a vulcanized tire.

Tires made according to the document WO 2013/079336 showed improved performance and allow at least one retread to be considered when the initial tread is worn.

The document US 2010/0186860 describes a tire having in the central region of its tread a pattern called "compact", that is to say a pattern that has no open grooves on the tread surface in the new state, but only incisions. Mechanical damage to the crown reinforcement can be reduced as a result of this arrangement.

The document EP 2292448 B1 describes a tire whose tread pattern comprises two open grooves on the tread surface as new, these grooves axially delimiting a central region, this central region being provided with at least one incision and having a cavity ratio per unit volume of less than 10% as new.

Definitions

A radial direction of a tire is a direction cutting the axis of rotation of the tire and perpendicular thereto. The expression "radially inside or radially outside, respectively" signifies "whose radial distance measured from the axis of rotation of the tire is less than, or greater than, respectively".

An axial direction or transverse direction denotes a direction which is parallel to the axis of rotation of the tire.

A circumferential direction denotes a direction which is tangent to any circle centred on the axis of rotation of the tire.

A cut-out denotes, in a general way, a cavity formed in a tread, where this cavity may take the form of a groove opening on the tread surface, an incision also opening on the tread surface, a cavity or channel formed to be entirely below the tread surface as new, or a combination of incisions and cavities.

A groove denotes a space or cavity formed in a tread, this groove being delimited by walls of material facing each other and linked by the bottom of the groove. Each groove has a depth equal to not more than the thickness of the tread, and the walls of material delimiting it do not come into contact with one another in the usual running conditions of the tire.

An incision denotes the space formed in a tread between walls of material facing one another over a depth equal to not more than the thickness of the tread, said walls of the incision being capable of coming into contact with one another, at least partially, in usual running conditions of the tire.

A channel denotes a cavity volume formed entirely within a tread, this channel having a cross section of maximum width and maximum height. A channel may be linked to at least one other channel to form a fluid flow channel in the tread. Similarly, a channel may be linked to at least one incision. A channel may form a new groove opening on the tread surface after a predetermined partial wear of the tread.

A tire tread has a suitable thickness for a given use, and is also provided with a tread pattern. This tread pattern is formed of relief elements such as ribs and blocks, these relief elements being delimited by grooves, incisions, and cavities and cut-outs in general. These cavities and cut-outs also have the function of discharging any water present on the roadway so as to provide a good contact between the tread and said roadway.

A relief element has a contact face, this face being designed to come into contact with the roadway during running, and side faces cutting the contact face at edges.

The surface of a tread denotes the set of contact faces of all the relief elements of a tread coming into contact with a roadway during running.

Some present-day tires, called "road tires", are designed to roll at high speed over increasingly long distances. As a result, notably, of the improvement of the road network, the growth of the motorway network and the increase in international exchanges, it has been found that the wear performance of tires has been increased, as demonstrated by the increased distances travelled. This increase may be counterbalanced by the fact that the crown reinforcement is subjected to greater stress.

The usual running conditions of the tire, or its conditions of use, are those defined by the ETRTO standard for running in Europe; these conditions of use specify the reference inflation pressure corresponding to the load capacity of the tire, indicated by its load index and its speed code. These conditions of use may also be called the "nominal conditions" or "usage conditions".

This finding justifies the research undertaken by the applicant to derive the maximum benefit from the potential of these new combinations.

BRIEF DESCRIPTION OF THE INVENTION

An object of the invention is to improve the retread capacity of a tire, the crown reinforcement of the tire being lightened in weight by using a specific tread material and a specific tread pattern in combination.

For this purpose, a heavy goods vehicle tire is proposed, comprising beads designed to make contact with a mounting rim, these beads being prolonged radially outwards by sidewalls which are themselves joined to either side of a crown portion, this crown portion being covered radially on the outside by a tread having a total thickness of material to be worn which determines a wear limit, and having a tread surface for making contact with a roadway. This tread comprises at least two cut-outs having a generally circumferential orientation. The two circumferential cut-outs spaced farthest apart axially delimit a central region and two edge regions on either side in the tread, the central portion having a width Lc of between 35% and 70% of the total width W of the tread.

This tire comprises a carcass reinforcement anchored in the beads and extending in the sidewalls and in the crown portion, the crown portion of the tire comprising a crown reinforcement radially outside the carcass reinforcement. The crown reinforcement comprises at least two working layers which have reinforcing elements orientated parallel to one another in the same layer, and whose reinforcing elements consist of cords composed of UHT-grade threads, that is to say cords whose elementary threads have a mechanical breaking strength R that satisfies the following relation:

$R \geq 4180 - 2130 \times D$, where R is expressed in MPa and D is the diameter of the thread expressed in millimetres (× indicates the operation of multiplication).

This tread is also formed of at least two layers of material superimposed in the radial direction, namely a first layer and a second layer, the first layer being radially nearer to the crown reinforcement than the second layer, the material forming the first layer being chosen to have a breaking elongation of more than 600% at a temperature of 60° C.

This tread is also such that:
  in the central portion of the tread radially surmounting the crown reinforcement and delimited axially by the axially outermost circumferential cut-outs, a cavity ratio per unit volume as new is defined between the tread surface and a surface parallel to the tread surface and passing through the innermost points of the cut-outs, this cavity ratio per unit volume being not more than 10%,
  in this central portion of the tread, the surface cavity ratio of the tread as new and over any surface to a depth equal to at least 50% of the thickness to be worn is not more than 10%.

Because of this combination, it is possible to produce a tire retaining a good retread capacity. In this invention, the tread pattern applied to the central portion of the tread is of the closed or compact type, by contrast with the usual tread patterns comprising channels opening on the tread and having a large depth corresponding to the limit of use in terms of wear.

However, the edge regions may comprise circumferential channels and/or transverse or oblique channels.

The thickness of material to be worn corresponds, as a general rule, to the distance between the tread surface as new and the innermost points of the incisions or channels of the tread.

The tread pattern as new also provides high structural rigidity in the central portion of the tread, owing to the larger volume of material in the new state.

Additionally, the formation of a compact tread pattern in the central portion of the tread protects both the first layer of material of the tread nearest to the crown reinforcement and the crown reinforcement itself. This is because this compact tread pattern limits the risk of penetration of damaging objects into the tread in this central portion of the tread, at least in the initial stages (that is to say, before the new grooves appear).

Because of its high breaking elongation (over 600%), the first, radially innermost layer of the tread enables greater distances to be reached before retread than those achieved with prior art tires. When the outermost layer of the tread is worn, and the tread consequently becomes thinner, the tires become more sensitive to certain types of damage such as slipping, cutting, or penetration by small stones or other objects. The term "slipping" is taken to mean wear on the tread that occurs, notably, during running around roundabouts or in parking manoeuvres. After partial wear, the appearance of the first, radially innermost layer of the tread which has a breaking elongation of more than 600% results in better resistance to this type of damage.

One method of obtaining a low cavity ratio per unit volume in the central portion of the tread consists in forming, at least in the material forming the radially outermost layer of the tread, a cavity concealed inside the tread, this concealed cavity possibly being prolonged towards the tread surface by an incision.

Any incisions present in the central portion make it possible to generate edges which are useful for grip during running; this presence is compensated by the capacity of these incisions to close, bringing their facing walls into contact with one another. Additionally, the presence of radial channels formed below the tread surface enables any water present during rainfall to be captured in this central area, thereby favouring the grip of the tire during running.

The forming of concealed cavities is described, notably, in the document U.S. Pat. No. 9,022,083 B1, which combines channels concealed in the thickness of a tread, these channels being surmounted by incisions that intersect to form a network; radial channels are also formed at the intersections of the incisions.

In another procedure, as described in the document EP2694301 B1, a network of grooves is formed, comprising a sequence of portions opening on the tread surface as new and closed portions, the latter being concealed in the thickness of the tread. These grooves may be seen as grooves undulating between the tread surface as new and a maximum depth. In this case also, the cavity ratio per unit volume is very considerably reduced by comparison with tires in which the treads are provided with the usual grooves.

Advantageously, the tread of a tire according to the invention is formed of at least two layers of different materials, namely a first layer near the crown reinforcement as defined above and radially surmounted on the outside by a second layer, this second layer having the following properties: a macro-dispersion rating Z of more than 80 and a maximum value of $\tan(\delta)$, denoted $\tan(\delta)max$, of less than 0.130.

According to a preferred embodiment of the invention, the breaking elongation of the second layer forming the radially outer portion of the tread is less than that of the first, radially innermost layer.

Preferably also, the breaking elongation of the first layer is greater than that of the second layer forming the radially outer layer of the tread.

According to an advantageous variant of the invention, the ratio of the volume of the first layer to the sum of the volumes of the first and second layers is between 25% and 70%.

The profile of the first layer seen in a sectional plane containing the axis of rotation of the tire is suitable to enable this first layer to appear in a uniform way over at least the whole width of the central portion of the tread after partial wear of the tread.

Also advantageously, the ratio between the thickness of the first layer of the tread, measured on a meridian cross section of the tire in the radial direction at the axial end of the radially outermost working layer, and the sum of the thicknesses of the first and second layers of the tread is between 15% and 50%.

Advantageously, the width Lc of the central portion of the tread delimited by the axially outermost circumferential cut-outs is equal to at least 50% and at most 70% of the total width W of the tread.

To improve the potential retreadability of the tire further, it is preferable to limit the cavity ratio per unit volume of the central portion of the tread to not more than 6%.

An advantageous variant of the invention also provides for the presence of an intermediate layer located radially between the tread and the crown reinforcement, the material forming this intermediate layer being chosen to have a maximum value of $\tan(\delta)$ of not more than 0.100. The presence of this intermediate layer may, notably, make it possible to compensate for the temperature rise due to the presence of a first dissipating layer. This layer is not initially designed to come into wear-inducing contact with the roadway during running.

Advantageously also, the intermediate layer has a loss of not more than 20% at 60° C.

Advantageously, all the layers of the crown reinforcement consist of cords formed of UHT-grade threads.

Advantageously, the carcass reinforcement, when composed of metal cords, may be formed with cords of UHT-grade threads.

In a useful variant, the channels formed in the central region of the tread are, for the most part at least, present in the first, innermost tread layer.

According to any of the aforementioned embodiments of the invention, the crown reinforcement may also be supplemented on its radially inner side, between the carcass reinforcement and the radially inner working layer nearest to said carcass reinforcement, by what is called a triangulation layer consisting of inextensible metal reinforcing elements, lying at an angle of more than 60° to the circumferential direction, the reinforcing elements of this triangulation layer also being formed of UHT-grade threads.

Other characteristics and advantages of the invention will be apparent from the following description provided with reference to the appended drawings, which show, by way of non-limiting examples, embodiments of what is proposed by the invention.

DETAILED DESCRIPTION OF THE DRAWINGS

For the figures accompanying this description, the same reference symbols may be used to describe variants of the invention where these reference symbols signify elements which are of the same kind in respect of their structure or function.

According to the invention, the volume and thickness measurements are made on tires in the new state, that is to say tires that have not run and therefore have no wear on the tread. The same applies to the physical characteristics of the rubber materials and the reinforcing materials.

Figure 1:
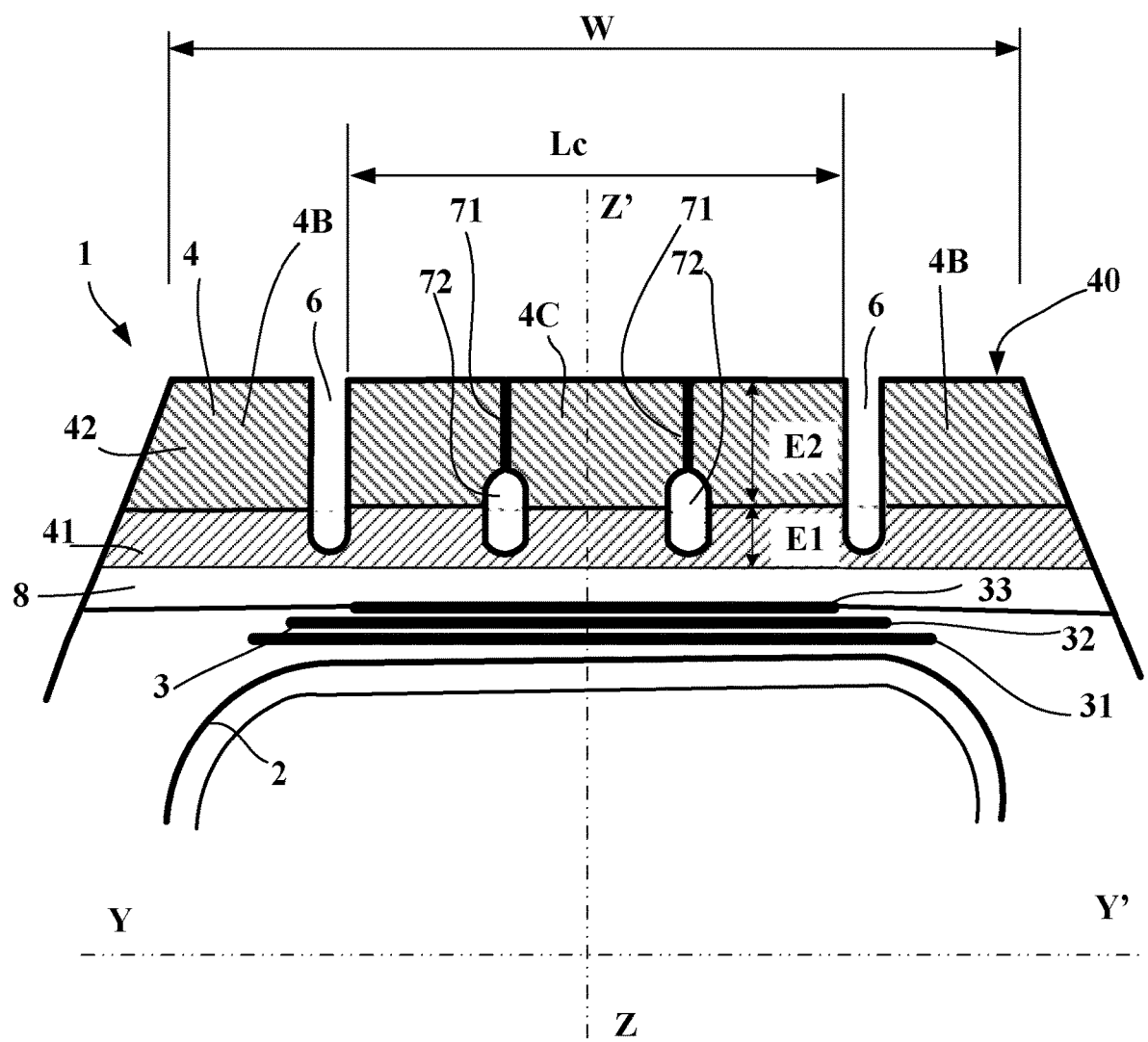
FIG. 1 shows a partial sectional view of a variant of a tire provided with a tread according to the invention.

FIG. 1 shows, in a meridian cross section (that is to say in a plane containing the axis of rotation YY') a portion of a tire 1 of the 385/55 R22.5 size, designed for fitting to a heavy goods vehicle, this tire 1 comprising a carcass reinforcement 2 surmounted radially on the outside by a crown reinforcement 3. This tire 1 further comprises, radially on the outside of the crown reinforcement 3, a tread 4 formed according to the invention. This tread 4 has a total width W corresponding to the average width of the tread coming into contact with a roadway in zero speed conditions of use of the tire. In the present case, this width W is equal to 320 mm. This tread 4 comprises, radially on the outside, a tread surface 40 designed to come into contact with the roadway when the tire is running.

The crown reinforcement 3 comprises three layers of reinforcement, namely two working layers 31, 32, each reinforced by inextensible reinforcing elements that are parallel to one another in each layer, these reinforcing elements crossing over from one layer to the next and lying at an angle of about 18 degrees to the circumferential direction. Radially on the outside, these working layers 31, 32 are surmounted by a protective layer 33 designed to protect the working layers and the carcass reinforcement against mechanical damage during running. This protective layer 33 is essential, because it partially determines the possibility of retreading the tire, that is to say the possibility of reconstructing a tire by replacing a tread after a predetermined degree of wear has been reached. This protective layer 33 is formed by a plurality of reinforcing elements that are called "elastic", that is to say exhibiting a considerable structural elongation under a small force, these reinforcing elements being orientated relative to the circumferential direction at an angle of 18 degrees and in the same direction as the angle formed by the inextensible elements of the working layer radially adjacent to the protective layer.

Each working layer 31, 32 of the crown reinforcement 3 comprises a plurality of cords having the formula 9-35 (9 thread elements, each with a diameter of 0.35 mm), each thread being made from a UHT grade of steel having a breaking strength R of 3620 MPa.

The protective layer 33 consists of a plurality of cords, each formed of 6 threads, each with a diameter of 0.35 mm.

The tread 4 is formed by the superimposition of a first layer 41 having a thickness E1 of 4 mm and a second layer 42 having a thickness E2 of 8 mm, each of these two layers being formed of an appropriate material.

The material forming the first layer 41 nearest to the crown reinforcement 3 has a breaking elongation of 630%, a breaking stress of 22 MPa and a hysteresis characteristic $tan(\delta)max$ of 0.151.

The material forming the second layer 42, designed to come into contact with the roadway during running as new, has a breaking elongation of 580%, a breaking stress of 20.5 MPa and a hysteresis characteristic $tan(\delta)max$ of 0.125.

As may be seen in this FIG. 1, this tread 4 is provided with two circumferential grooves 6 opening on the tread surface 40 as new and extending around the whole tire; these two circumferential grooves 6 have a depth of 11 mm.

These two circumferential grooves 6 delimit between them a central region 4C having a width Lc of 193 mm (representing 60.3% of W) and edge regions 4B free of any cut-outs in the variant described (the limits of this central region coincide with the lateral walls axially nearest to the mid-plane ZZ').

It should be noted that the central region 4C is free of any channel opening on the tread surface 40 as new. The circumferential grooves 6 are located axially outside the ends of the protective layer 33 and axially inside the ends of the working layers 31, 32.

However, the central region 4C is provided with two circumferential incisions 71 extending in the depth of the tread 4 to a depth of 6 mm.

These two incisions 71 with a width of 0.6 mm are prolonged by channels 72 with a maximum width of 6 mm and a height of 6 mm, these channels 72 being designed to form new channels opening on the tread surface after partial wear of the tread corresponding to a wear of at least 6 mm. When these new channels open on the tread surface after partial wear, the material in contact with the roadway is still the material forming the second layer 42 of the tread 4, that is to say the radially outermost material in the new state.

In the central region 4C, the cavity ratio per unit volume as new is 4%. In the same central region 4C, the surface cavity ratio as new is 1%, and is retained until the new grooves formed by the channels 72 appear.

Additionally, in this variant, an additional layer 8 is provided radially under the tread 4, this layer having an average thickness of 4 mm which is substantially constant over the whole width of the tire crown, the material forming this additional layer 8 being chosen to have a value of $tan(\delta)max$ of 0.08 in the present case. This additional layer 8 is not initially designed to come into contact with the roadway during the running of the tire.

Also advantageously, the additional layer 8 has a hysteresis loss of 9.5% measured at 60° C.

Figure 2:
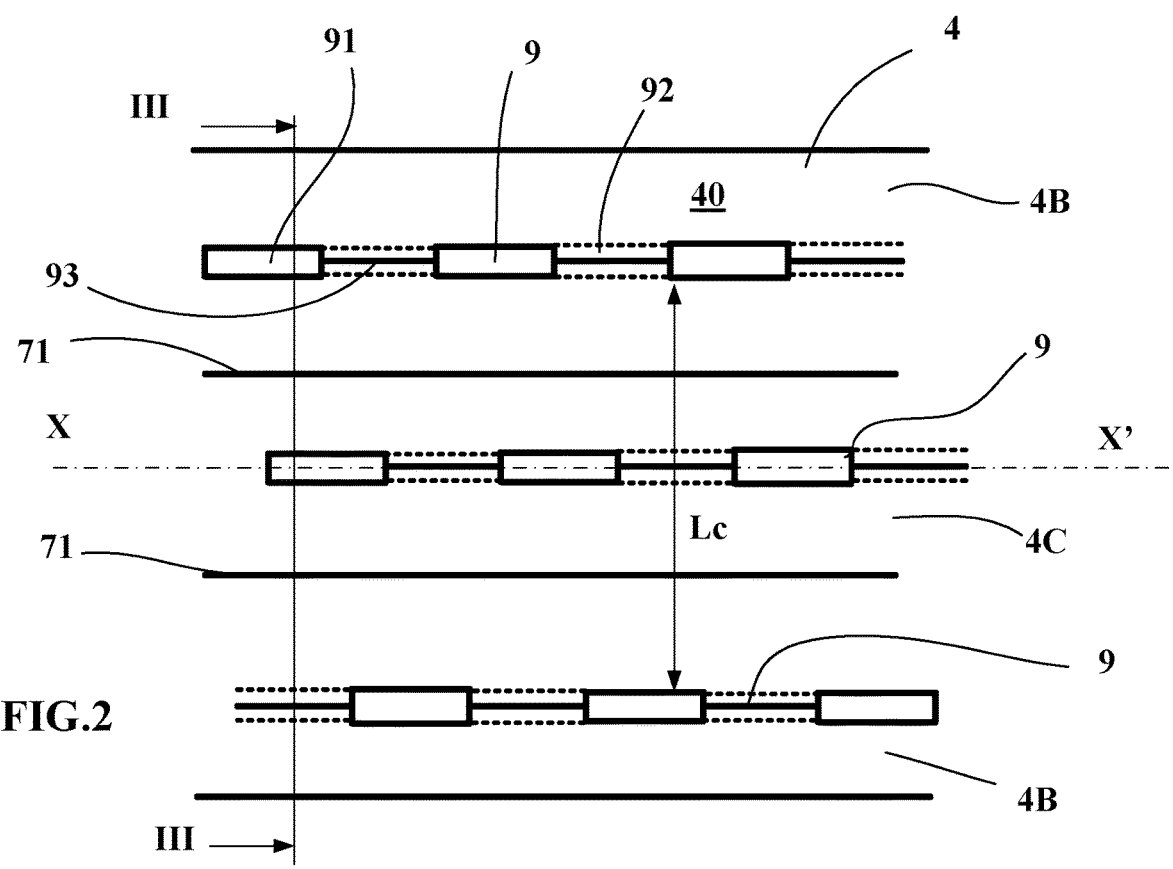
FIG. 2 shows a surface view of the tread according to another variant of the invention.

FIG. 2 shows a variant tread 4 according to the invention, this tread being free of any groove opening continuously on the tread surface 40 in the new state. According to this variant, the tread 4 is provided with three undulating grooves 9 in the thickness of the tread 4, and, interleaved between these undulating grooves, two incisions 71, each prolonged in the thickness of the tread by a channel 72.

Each undulating groove 9 extends in the circumferential direction XX' and comprises a plurality of portions 91 opening on the tread surface 40 as new, these open portions 91 being prolonged towards the inside of the tread by linking portions joining concealed portions 92 so as to provide a continuity of fluid flow in the undulating groove 9. To facilitate moulding and demoulding, an incision 93 is formed connecting the concealed portions 92, the linking portions and the open portions 91.

Figure 3:
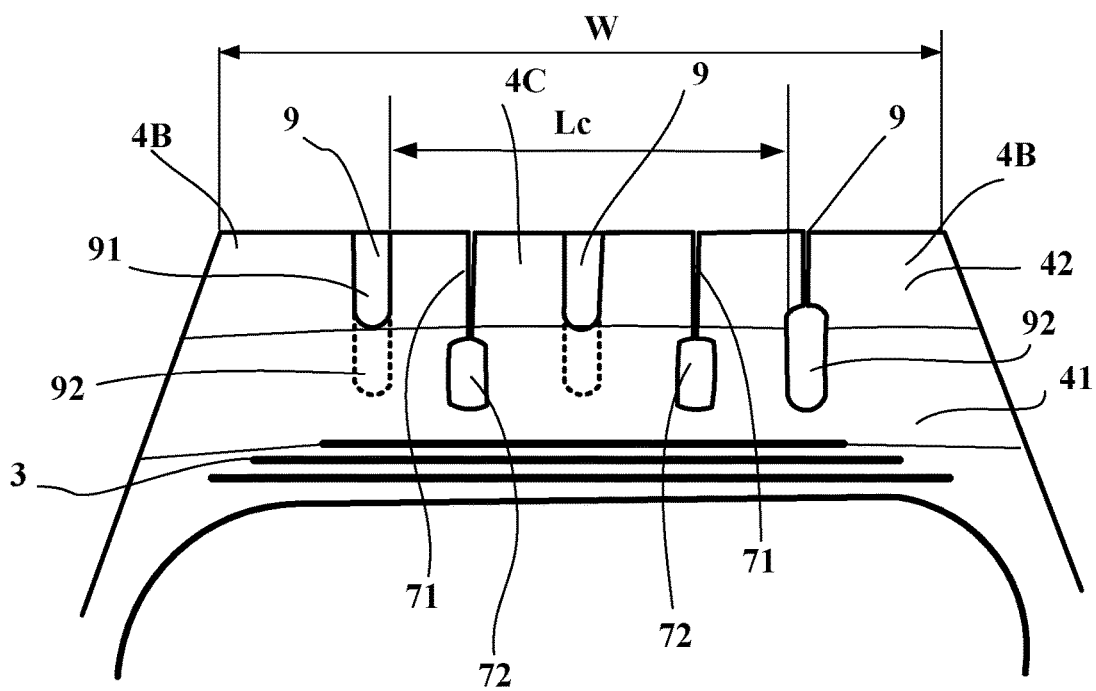
FIG. 3 shows a sectional view of the tread variant according to the invention shown in FIG. 2.

As may be seen in FIG. 3, which is complementary to FIG. 2 in that it shows a section taken along a plane whose position is shown by the line in FIG. 2, the concealed portions 92 of the undulating grooves 9 are designed to open on the tread surface 4 after a predetermined partial wear and before the open portions 91 are completely effaced.

The axially outermost undulating grooves 9 define a central portion 4C of the tread and edge portions 4B on either side. The width Lc of the central portion 4C is evaluated in the present case as the average distance between the axially inner walls of the axially outermost undulating grooves 9.

Incisions 71 are formed between the undulating grooves 9, these incisions closing when passing through contact during the running of a tire provided with this tread, these incisions 71 being prolonged in the thickness of the tread by channels 72 designed to form new grooves after the partial wear of the tread. In this example, the maximum width of the channels 72 is identical to the width of the concealed portions 92 of the undulating grooves 9. The bottom of each channel 72 is located at the same distance from the tread surface 40 as the bottom of the concealed portions 92 of the undulating grooves.

Additionally, and as shown in FIG. 3, the tread 4 comprises a first (inner) layer 41 and a second (outer) layer 42, the second layer 42 being designed to come into wearing contact with the roadway before the first (inner) layer 41. The first (inner) layer 41 is directly in contact with the crown reinforcement 3 in this variant.

The thickness of the second layer 42 of the tread 4 is appropriate for substantially coinciding with the bottom of the open portions 91 of the undulating grooves 9. The material forming the first layer is chosen to have a breaking elongation of more than 600% at a temperature of 60° C.

In this second variant, the crown reinforcement 3 comprises two working layers which have reinforcing elements orientated parallel to one another in the same layer, and whose reinforcing elements consist of cords composed of UHT-grade threads, that is to say cords whose elementary threads have a mechanical breaking strength R that satisfies the following relation:

R (MPa)≥4180−2130×D, where D is the diameter of the thread expressed in millimetres.

This tread is also such that:
in the central portion 4C of the tread 4 radially surmounting the crown reinforcement 3 and delimited axially by the axially outermost circumferential cut-outs 9, a cavity ratio per unit volume as new is defined between the tread surface and a surface parallel to the tread surface and passing through the innermost points of the cut-outs, this cavity ratio per unit volume being not more than 10%,
in this central portion 4C of the tread, the surface cavity ratio of the tread as new and over any surface considered to a depth equal to at least 50% of the thickness to be worn is not more than 10%.

Clearly, the invention, which has been described with the aid of two variants, is not limited to these, and various modifications may be made to it without departure from the scope of the invention as defined by the claims. Notably, the channels may have different cross sections, according to whether they are prolonging longitudinal incisions or circumferential incisions. Additionally, the incisions may be in zigzag form, either in their depth or on the tread surface. It is also possible to provide connections between the concealed channels and the grooves in order to generate a kind of fluid flow network.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A heavy goods vehicle tire, comprising beads designed to make contact with a mounting rim, these beads being prolonged radially outwards by sidewalls which are themselves joined to either side of a crown portion, this crown portion being covered radially on the outside by a tread having a total thickness of material to be worn which determines a wear limit, and having a tread surface for making contact with a roadway, this tread comprising at least two cut-outs of generally circumferential orientation, the two circumferential cut-outs which are spaced farthest from one another axially delimiting in the tread a central region and two edge regions, the central region having a width Le of between 35% and 70% of the total width W of the tread, this tire comprising a carcass reinforcement anchored in the beads and extending into the sidewalls and into the crown portion, the crown portion of the tire comprising a crown reinforcement radially outside the carcass reinforcement, the crown reinforcement comprising at least two working layers having reinforcing elements orientated parallel to one another in the same layer, these reinforcing elements being cords consisting of UHT-grade threads, that is to say threads having a mechanical breaking strength R satisfying the following relation:
R 4180−2130×D, where R is expressed in megaPascals (MPa) and D is the diameter of the thread expressed in millimeters,
this tread being formed of at least two layers of material superimposed in the radial direction, namely a first layer and a second layer, the first layer being radially nearer to the crown reinforcement than the second layer, the material forming the first layer being chosen to have a breaking elongation of more than 600% at a temperature of 60° C., wherein:
each of the at least two circumferential cut-outs forms undulating grooves such that none of the at least two circumferential cut-outs opens continuously into the tread surface in the new state, each undulating groove extending in the circumferential direction and comprising a plurality of portions opening on the tread surface as new, such that for any given axial cross-sectional line, less than all of the undulating grooves will have portion opening on the tread,
in the central region (4C) of the tread radially surmounting the crown reinforcement and delimited axially by the axially outermost cut-outs, a cavity ratio per unit volume as new is defined between the tread surface and a surface parallel to the tread surface and passing through the innermost points of the cut-outs, this cavity ratio per unit volume being not more than 10%, and
in this central region of the tread the cavity ratio as new and over any surface to a depth equal to at least 50% of the thickness to be worn is not more than 10%,
the tread further comprising, in the first layer, at least one further circumferential cut-out formed in the central region of the tread, wherein the at least one further circumferential cut-out in the central region forms, when new, an undulating groove such that none of the at least two circumferential cut-outs, nor the at least one further circumferential cut-out opens continuously into the tread surface in the new state,
wherein the tread further comprising at least one first incision formed in the central region of the second layer of the tread axially between two respective undulating grooves and at least one second incision formed between the at least two circumferential cut-outs, wherein the at least one first incision extends in the depth of the tread and is axially separated from each of the at least two undulating grooves.

2. The tire according to claim 1, wherein the tread of this tire is formed of at least two layers of different materials, the second, outermost layer having a macro-dispersion rating Z of more than 80 and a maximum value of tan(o), denoted tan(o)max, of less than 0.130.

3. The tire according to claim 1, wherein the breaking elongation of the second layer forming the radially outer portion of the tread is less than that of the first, radially innermost layer.

4. The tire according to claim 1 wherein, the breaking energy of the first layer is greater than that of the second layer.

5. The tire according to claim 1, wherein, the ratio of the volume of the first, innermost layer to the sum of the volumes of the first and second layers of the tread is between 25% and 70%.

6. The tire according to, claim 1, wherein the profile of the first layer seen in a sectional plane containing the axis of rotation of the tire is appropriate for this first layer to appear in a uniform way over at least the whole width of the central region of the tread after partial wear of said tread.

7. The tire according to, claim 1, wherein the ratio between the thickness of the first layer of the tread, measured on a meridian cross section of the tire in the radial direction at the axial end of the radially outermost working layer, and the sum of the thicknesses of the first and second layers of the tread is between 15% and 50%.

8. The tire according to claim 1, wherein an intermediate layer is interleaved radially between the tread and the crown reinforcement, the material forming this intermediate layer being chosen to have a value of tan(o)max of not more than 0.100.

9. The tire according to claim 8, wherein the intermediate layer has a loss of not more than 20% at 60° C.

10. The tire according to, claim 1, wherein the cavity ratio per unit volume of the central region is not more than 6%.

11. The tire according to claim 1, wherein the at least one first incision is prolonged at its radially inner end by a circumferential channel.

* * * * *